Patented Jan. 7, 1941

2,228,158

UNITED STATES PATENT OFFICE 2,228,158

CASEIN VEHICLE AND METHOD OF MAKING SAME

Robert R. Teale, Snyder, N. Y., assignor to National Gypsum Company, Buffalo, N. Y.

No Drawing. Application August 28, 1937, Serial No. 161,523

15 Claims. (Cl. 134—12)

This invention relates to a casein dispersion and solution and to a method of making the same.

Casein has been used heretofore for the manufacture of so-called water paints and to this end the casein was rendered soluble, generally by solution in alkalies. Where strong alkalies were used to dissolve the casein putrefaction degraded the casein.

It is an object of the present invention to provide a solution that contains casein in dispersed form suitable for use in the manufacture of water paints and other industrial purposes.

It is a further object of the invention to provide a casein dispersion that possesses advantageous gel-like properties and possesses substantially uniform viscosity over the normal temperature range encountered in use.

It is a still further object of the invention to provide a casein solution that may be maintained upon the alkaline side without danger of putrefaction.

It is also an object of the invention to prepare a casein dispersion of good color and one that does not darken upon addition of alkalies thereto.

Further objects and advantages of the invention will appear in the following description thereof and will be pointed out with particularity in the claims.

In accordance with the invention, the casein to be dispersed is treated with water and a water soluble reducing salt, described more fully hereinafter, for a time and at a temperature sufficient to cause the casein particles to absorb water, swell and form a dispersion of gel-like consistency. The pH of casein-water mixtures is about 4.7 and after treatment with the reducing salt, the pH of the solution is between about 4.7 and 6 so that alkali must be added after the swelling treatment to dissolve the casein and bring the pH to the range of pH 6 to pH 9. To this end the casein, with any suitable quantity of water, is heated to an elevated temperature, generally above about 40° C. and below about 90° C., with the water soluble salt. The white powdered casein quickly swells and disperses throughout the water vehicle and a heavy viscous mass results, the viscosity of which is relatively uniform over the temperature ranges normally encountered in use of the dispersion.

The water soluble reducing salts used as a swelling aid in dispersing the casein are the alkali metal, including ammonium, salts of the oxy acids of sulfur normally having reducing characteristics, as for instance, the sulfites, bisulfites, thiosulfates and hydrosulfites and the like. The amount of salt required is generally less than about 10% of the weight of the dry casein. As an example, 25 parts of sodium sulfite are added to a mixture of 350 parts dry casein and 1350 parts water and the whole heated to above 40° C. and usually to about 90° C. and the temperature maintained at this point until a heavy viscous gel of dispersed casein is produced. The period of heating is, in general, about one-half to one hour, although lower temperatures require somewhat longer heating periods. At temperatures far in excess of the upper limit mentioned, if the solution be alkaline, adverse color changes may occur in the casein solution. A water soluble bisulfite, thiosulfate or hydrosulfite may be substituted for the sulfite, more or less additional alkali being required to effect final dispersion depending upon the acidity of the salt and the desired final pH.

Where solution is desired having an alkaline reaction, soluble alkalies are added to the dispersion and the pH value thus regulated. In general, the alkalinity is regulated to less than about pH 9 and generally between about pH 6 to 9 and ammonium hydroxide, borax, caustic soda or other suitable alkali added in amount sufficient to produce the desired pH. The alkali, if ammonia, is added preferably after heating the casein, reducing salt and water mixture. When fixed alkalies such as borax, caustic soda, soda ash and the like are employed, the alkali may be added at any stage of the treatment.

By use of a hydrosulfite exceptionally good color is obtained in the finished dispersion, particularly by heating at relatively high temperatures, although both the sulfite and thiosulfate produce dispersions of a good degree of whiteness. As an example, 350 parts of dry casein, 1350 parts of water and 10 parts of sodium hydrosulfite were heated for 45 minutes at 95° C. and a sparkling white dispersion obtained of a pH value of 8.5 by incorporation of 75 parts of borax therewith. When cooled the dispersion was found to be relatively permanent and possessed a viscosity substantially the same as that of the heated dispersion as tested by the rate of movement of a plunger through a mold substantially filled with the casein solution.

When using thiosulfate crystals allowance must be made for the water of crystallization and 50 parts of sodium thiosulfate crystals with about 350 parts of dry casein, 75 parts of borax and 1350 parts of water produce a good dispersion.

It will be understood that dispersions can be made by employing a greater quantity of water than that specified with production of dispersions of less viscosity. The dispersing aid employed in the present invention is a water soluble salt of the reducing oxy acids of sulfur.

What is claimed is:

1. The method of dispersing casein which comprises subjecting the casein at a temperature above 40° C. to treatment with water and a water soluble thiosulfate under acidic conditions at a temperature and for a time sufficient to form a thick dispersed gel, the amount of thiosulfate being sufficient to effect dispersion but less than about 10% based on the casein.

2. The method of dispersing casein which comprises subjecting the casein at a temperature above 40° C. to treatment with water and a water soluble hydrosulfite under acidic conditions at a temperature and for a time sufficient to form a thick dispersed gel, the amount of hydrosulfite being sufficient to effect dispersion but less than about 10% based on the casein.

3. A dispersion of casein comprising a thick heavy gel of casein and water formed by treating casein with water and less than about 10% based on the casein of a water soluble reducing salt of an oxy acid of sulfur under acidic conditions.

4. A dispersion of casein comprising a thick, heavy gel of casein and water formed by subjecting casein to treatment with water and less than about 10% based on the casein of a water soluble sulfite under acidic conditions.

5. A alkaline casein solution which comprises a dispersion of casein in water formed by treating casein with water and less than about 10% based on the casein of a water soluble reducing salt of an oxy acid of sulfur under acidic conditions to swell the casein and thereafter with an added alkaline substance, said solution having a pH value of less than about 9.

6. A dispersion of casein comprising a thick, heavy gel of casein and water formed by subjecting casein at a temperature above 40° C. to treatment with water and less than about 10% based on the casein of a water soluble thiosulfate at an elevated temperature and under acidic conditions.

7. A dispersion of casein comprising a thick, heavy gel of casein and water formed by subjecting casein at a temperature above 40° C. to treatment with water and less than about 10% based on the casein of a water soluble hydrosulfite at an elevated temperature and under acidic conditions.

8. An alkaline casein solution which comprises a dispersion of casein in water formed by treating casein with water and less than about 10% based on the casein of a water soluble sulfite under acidic conditions and in amounts sufficient to swell the casein, said solution containing an added alkaline substance and having a pH value of less than about 9.

9. An alkaline casein solution which comprises a dispersion of casein in water formed by treating casein at a temperature above 40° C. with water and less than about 10% based on the casein of a water soluble thiosulfate, said solution containing an added alkaline substance and having a pH value of less than about 9.

10. An alkaline casein solution which comprises a dispersion of casein in water formed by treating casein at a temperature above 40° C. with water and less than about 10% based on the casein of a water soluble hydrosulfite, said solution containing an added alkaline substance and having a pH value of less than about 9.

11. The step in the method of dispersing casein which comprises treating the casein with a water soluble reducing salt of an oxyacid of sulfur in the presence of water and under acidic conditions, the quantity of the salt being sufficient to cause the casein to swell but less than about 10% based on the casein.

12. The step in the method of dispersing casein which comprises treating the casein with a water soluble sulfite in the presence of water and under acidic conditions, the quantity of the sulfite being sufficient to cause the casein to swell but less than about 10% based on the casein.

13. The step in the method of dispersing casein which comprises treating the casein with water and a water soluble reducing salt of an oxyacid of sulfur under acidic conditions between about 40° C. and 90° C. until a thick gel is formed the salt being less than about 10% based on the casein.

14. The method of making a casein solution which comprises treating casein with water and a water soluble reducing salt of an oxyacid of sulfur under acidic conditions the salt being sufficient in amount to cause the casein to swell but less than about 10% based on the casein and after swelling treating the casein with a water soluble alkali to dissolve the casein but insufficient in amount to produce a pH greater than about pH 9.

15. The method of making a casein solution which comprises treating casein with water and a water soluble sulfite under acidic conditions the sulfite being sufficient in amount to cause the casein to swell but less than about 10% based on the casein and after swelling treating the casein with a water soluble alkali to dissolve the casein but insufficient in amount to produce a pH greater than about pH 9.

ROBERT R. TEALE.